Oct. 6, 1964
E. HERMANNI
3,152,213
PHOTOGRAPHIC OBJECTIVE
Filed Dec. 4, 1961
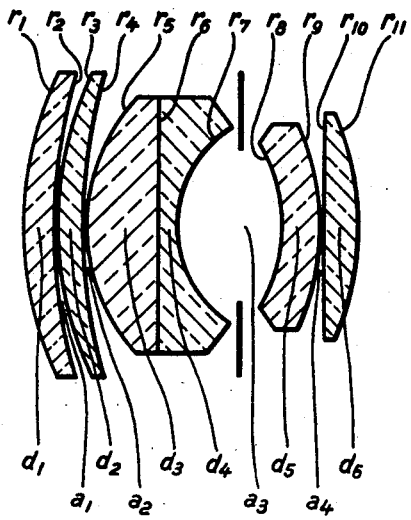
*INVENTOR*
*EUGEN HERMANNI*
BY
*AGENT*

United States Patent Office 3,152,213
Patented Oct. 6, 1964

---

3,152,213
PHOTOGRAPHIC OBJECTIVE
Eugen Hermanni, Katzenfurt, Germany, assignor to Ernst Leitz G.m.b.H. Optische Werke, Wetzlar, Germany, a corporation of Germany
Filed Dec. 4, 1961, Ser. No. 156,892
Claims priority, application Germany Dec. 10, 1960
1 Claim. (Cl. 88—57)

The present invention relates to high-speed photographic objectives of the modified Gauss type, with a rear optical member behind the objective aperture consisting of a simple, non-cemented negative meniscus lens and a separate simple positive lens.

According to the present invention, the front optical member ahead of the aperture, in the direction of the incident light, consists of two separate simple positive meniscus lenses and a cemented negative meniscus lens.

Throughout the specification and claim, all designations of "front" and "rear" are taken in relation to the direction of the incident light.

With an objective of the indicated characteristics, it has been possible to obtain a speed of $f{:}2$ for an image angle of 27°. Furthermore, such a construction makes it possible to use a rear optical member with a small diameter, which is an important consideration in mirror reflex cameras, for instance. This is attained by adding the additional positive lens to the front optical member. The omission of the correcting cemented surface in the negative meniscus of the rear optical member is balanced by the fact that the front optical member has two additional surfaces.

In accordance with a preferred embodiment of the present invention, the following relationships are to be observed in constructing the objective:

(1) $\quad 2.3f < 1/r_1 + 1/r_5 - 1/r_3 < 4.0f$ (2) $\quad 0.6 < r_8/r_9 < 0.72$ (3) $\quad 0.14 < d_3 + d_4 < 0.24$ wherein $f$ is the focal length of the objective, $r_1$ is the radius of the front surface of the first positive lens, $r_3$ is the radius of the front surface of the second positive lens, $r_5$ is the radius of the front surface of the cemented negative meniscus, $r_8$ and $r_9$ are the radii of the front and rear surfaces of the negative meniscus lens of the rear optical member, and $d_3 + d_4$ is the axial thickness of the cemented negative meniscus lens of the front optical member.

The above and other objects, advantages, and features of the invention will become more apparent by reference to the accompanying single figure of the drawing illustrating a photographic objective constructed according to the present invention. A new type of glass with the parameters $n_e = 1.69290$ and $\nu_e = 49.4$ is used for the first three lenses, such glass having the following approximate composition, all parts being by weight:

| | Percent |
|---|---|
| SiO | 15 |
| $B_2O_3$ | 20 |
| CaO | 20 |
| BaO | 17 |
| ZnO | 21 |
| $ZrO_2$ | 7 |

In the following table, $r_1$ and $r_2$ are the radii of the front and rear surfaces, respectively, of the first positive meniscus lens, $r_3$ and $r_4$ are the radii of the front and rear surfaces, respectively, of the second positive meniscus lens, $r_5$ and $r_7$ are the radii of the front and rear surfaces, respectively, of the cemented negative meniscus lens, $r_6$ is the radius of the cemented surface of the negative meniscus lens, $r_8$ and $r_9$ are the radii of the front and rear surfaces, respectively, of the meniscus lens of the rear optical member, $r_{10}$ and $r_{11}$ are the radii of the front and rear surfaces, respectively, of the separate positive lens of the rear optical member, $d_1$ and $d_2$ are the respective axial thicknesses of the first and second positive meniscus lenses, $d_3$ and $d_4$ are the axial thicknesses of two lenses forming the cemented negative meniscus lens, $d_5$ and $d_6$ are the respective axial thicknesses of the lenses of the rear optical member, $a_1$, $a_2$, $a_3$, and $a_4$ are the successive axial thicknesses of the air spaces between the first two positive meniscus lenses, between the second positive meniscus lens and the cemented negative meniscus lens, between the latter lens and the negative meniscus lens of the rear optical member, and between the lenses of the rear optical, $n_e$ is the refractive index, $\nu_e$ is the Abbe number of the lens glass, and $f$ is the focal length of the objective.

Table
[$f{:}2$; image angle: 27°]

| | | $n_e$ | $\nu_e$ |
|---|---|---|---|
| $r_1 = +0.69462$ | $d_1 = 0.07244$ | 1.69290 | 49.4 |
| $r_2 = +1.12979$ | $a_1 = 0.002$ | | |
| $r_3 = +0.69462$ | $d_2 = 0.07244$ | 1.69290 | 49.4 |
| $r_4 = +1.12979$ | $a_2 = 0.003$ | | |
| $r_5 = +0.36534$ | $d_3 = 0.13989$ | 1.69290 | 49.4 |
| $r_6 = -2.42522$ | $d_4 = 0.03967$ | 1.69416 | 30.9 |
| $r_7 = +0.22854$ | $a_3 = 0.18944$ | | |
| $r_8 = -0.30830$ | $d_5 = 0.07589$ | 1.73431 | 28.4 |
| $r_9 = -0.46674$ | $a_4 = 0.00978$ | | |
| $r_{10} = +3.25487$ | $d_6 = 0.07211$ | 1.69290 | 49.4 |
| $r_{11} = -0.55524$ | | | |

I claim:

A photographic objective of the modified Gauss type, comprising, in the direction of incident light, a front optical member ahead of the objective aperture and a rear optical member behind the objective aperture, the front optical member consisting of two separate positive meniscus lenses and a cemented negative meniscus lens, and the rear optical member consisting of a negative meniscus lens and a separate positive lens, and having the following characteristics:

[$f{:}2$; image angle: 27°]

| | | $n_e$ | $\nu_e$ |
|---|---|---|---|
| $r_1 = +0.69462$ | $d_1 = 0.07244$ | 1.69290 | 49.4 |
| $r_2 = +1.12979$ | $a_1 = 0.002$ | | |
| $r_3 = +0.69462$ | $d_2 = 0.07244$ | 1.69290 | 49.4 |
| $r_4 = +1.12979$ | $a_2 = 0.003$ | | |
| $r_5 = +0.36534$ | $d_3 = 0.13989$ | 1.69290 | 49.4 |
| $r_6 = -2.42522$ | $d_4 = 0.03967$ | 1.69416 | 30.9 |
| $r_7 = +0.22854$ | $a_3 = 0.18944$ | | |
| $r_8 = -0.30830$ | $d_5 = 0.07589$ | 1.73431 | 28.4 |
| $r_9 = -0.46674$ | $a_4 = 0.00978$ | | |
| $r_{10} = +3.25487$ | $d_6 = 0.07211$ | 1.69290 | 49.4 |
| $r_{11} = -0.55524$ | | | | wherein $r_1$ and $r_2$ are the radii of the front and rear surfaces, respectively, of the first positive meniscus lens, $r_3$ and $r_4$ are the radii of the front and rear surfaces, respectively, of the second positive meniscus lens,
$r_5$ and $r_7$ are the radii of the front and rear surfaces, respectively, of the cemented negative meniscus lens,
$r_6$ is the radius of the cemented surface of the negative meniscus lens,
$r_8$ and $r_9$ are the radii of the front and rear surfaces, respectively, of the negative meniscus lens of the rear optical member,
$r_{10}$ and $r_{11}$ are the radii of the front and rear surfaces, respectively, of the separate positive lens of the rear optical member,
$d_1$ and $d_2$ are the respective axial thicknesses of the first and second positive meniscus lenses,
$d_3$ and $d_4$ are the axial thicknesses of two lenses forming the cemented negative meniscus lens,
$d_5$ and $d_6$ are the respective axial thicknesses of the lenses of the rear optical member,
$a_1$, $a_2$, $a_3$, and $a_4$ are the successive axial thicknesses of the air spaces between the first two positive meniscus lenses, between the second positive meniscus lens and the cemented negative meniscus lens, between the latter lens and the negative meniscus lens of the rear optical member, and between the lenses of the rear optical member,
$n_e$ is the refractive index,
$v_e$ is the Abbe number of the lens glass, and
$f$ is the focal length of the objective.

References Cited in the file of this patent

UNITED STATES PATENTS 3,066,575    Mukai _____ Dec. 4, 1962

FOREIGN PATENTS 816,304     Great Britain _____ July 8, 1959
1,239,950   France _____ July 25, 1960
1,101,791   Germany _____ Mar. 9, 1961